(12) United States Patent
Holm

(10) Patent No.: US 7,445,713 B1
(45) Date of Patent: Nov. 4, 2008

(54) METHOD AND FACILITY FOR TREATING SLUDGES

(76) Inventor: Niels Holm, Vorm Thoren 6, 32425 Minden (DE)

( * ) Notice: Subject to any disclaimer, the term of this patent is extended or adjusted under 35 U.S.C. 154(b) by 0 days.

(21) Appl. No.: 11/812,952

(22) Filed: Jun. 22, 2007

(51) Int. Cl.
*C02F 3/28* (2006.01)
*C02F 11/04* (2006.01)

(52) U.S. Cl. ...................................................... 210/603
(58) Field of Classification Search ............... 210/603, 210/252, 259, 416.1
See application file for complete search history.

(56) References Cited

U.S. PATENT DOCUMENTS

| | | | |
|---|---|---|---|
| 4,375,412 A * | 3/1983 | Schimel | 210/603 |
| 4,632,758 A | 12/1986 | Whittle | |
| 4,948,509 A * | 8/1990 | Stack | 210/603 |
| 5,015,384 A * | 5/1991 | Burke | 210/603 |
| 5,529,692 A * | 6/1996 | Kubler | 210/603 |
| 5,630,942 A | 5/1997 | Steiner | |
| 6,663,777 B2 * | 12/2003 | Schimel | 210/603 |
| 2003/0075501 A1 | 4/2003 | Wilkie | |
| 2003/0173291 A1 * | 9/2003 | Schimel | 210/603 |

FOREIGN PATENT DOCUMENTS

| | | |
|---|---|---|
| DE | 4042223 | 7/1992 |
| DE | 102004003071 | 9/2005 |
| EP | 737651 | 10/1996 |

* cited by examiner

*Primary Examiner*—Fred Prince
(74) *Attorney, Agent, or Firm*—Diederiks & Whitelaw, PLC

(57) ABSTRACT

A method and apparatus for anaerobic treatment of wastewater and sludge in a digestive reactor in which the length of stay of hydraulic components is decoupled from that of particulate components by discontinuous removal of a portion of the digesting sludge from the digestive reactor, enrichment of the extracted portion of the digesting sludge in a sapropel reactor, and feedback of the enriched digesting sludge into the digestive reactor.

6 Claims, 2 Drawing Sheets

METHOD AND FACILITY FOR TREATING SLUDGES

BACKGROUND OF THE INVENTION

The invention concerns a method for anaerobic treatment of wastewater and sludge in a septic tank in which the length of stay of the hydraulic components is decoupled from that of the particulate components in the septic tank, and a facility for implementing this method.

A method for wastewater purification is known from German Patent DE 10 2004 003 071 A1, in which the accumulating permeate is fed back for washing the digested sludge. Circulating accumulating sediments and using them further in paramount processes is known from German Patent DE 40 42 223 A1.

For the treatment of sludges (for example, primary or excess sludges from sewage treatment plants), manure of cattle, swine or chickens or even so-called nawaros (renewable resources), the facilities mentioned at the beginning are usually designed for a length of stay which comes to ca. 20-30 days with mesophile facilities and ca. 10-15 days with thermophile facilities. With such facilities, the length of stay of particulate components of sapropels (which can be designated as the anaerobic sludge age) in the container (which bring about the anaerobic process transformations and guarantees a process-stable and largely anaerobic digestion of the substrates) is almost identical with the length of stay of the hydraulic components. In particular, a high sludge ages guarantee the stable establishment of methanogenic bacteria populations which are responsible for the last and decisive process step of digestion, methane fermentation.

Such a facility operation, in which the length of stay of the particulate components is almost identical with the length of stay of the hydraulic components (in which thus no decoupling of the length of stay of the purely soluble phase from that of the particulate phase exists), usually takes place when the substrate to be treated is highly concentrated. This exists, for example, when sewage sludges with a TS concentration (TS=dry substance)>=5% TS (=50 g/l TS) are used or when fluid wastewater has an organic carbon component (CSB=chemical oxygen requirement) from which a TS concentration of most possibly >3% TS results after digestion.

The lower the substrate concentration is with this type of process engineering with completely mixed reactors without hydraulic decoupling, the more unfavorable is the profitability with regard to gas yield/$m^3$ of reactor volume. Therefore sewage sludges with a TS concentration significantly below 5% dry substance are often subjected to a mechanical pre-thickening called concentrating to 5-6% TS.

Fluid wastewater with a low CSB concentration is in contrast often treated using special anaerobic processing engineering which guarantees a hydraulic decoupling. The widespread UASB method belongs to this. With this method, the liquid substrate to be digested is fed to a UASB reactor in the bottom region. The lower reactor region is filled with anaerobic granulas (that is anaerobic biology). When flowing through this region, the wastewater is digested and only the predominantly liquid digested phase enters through the upper reactor region into the outflow. In this way, the sapropel biomass is decoupled from the pure hydraulics, and the length of stay of this biomass is greatly increased in relation to the pure length of stay of the hydraulic components. The volume of the UASB reactor can consequently be designed smaller than according to usual purely hydraulic standards in connection with completely mixed reactors.

In both cases, the goal sought is nonetheless attained only on the basis of considerable technical additional expenditures. Moreover the anaerobic granulas prove to be unfavorable with regard to more extensive treatment methods, such as, for example, sapropel decomposition.

SUMMARY OF THE INVENTION

The invention is based upon the objective of creating a method and a facility for implementing this method, which enables an economical operation in connection with a long length of stay of the particulate components.

Hence, a method is proposed in accordance with which a component stream (3-20% of the reactor volume) is removed from the anaerobic reactor proper and conducted into a so-called sapropel enrichment reactor FAR. In relation to the liquid phase, the latter has a direct connection to the anaerobic reactor proper which can be closed/opened automatically so that communicating water columns exist in the opened state.

According to a preferred embodiment of this invention, a gas pump conveys the gas out of the FAR into an external gas storage facility. Conveying the gas from the FAR 2 into the anaerobic reactor 1 is also possible.

According to a further preferred embodiment, the sapropel concentrate is removed from the anaerobic reactor proper, for example through a drain 9. A removal from the FAR, for example through a drain 10 is also possible, or it is removed through the clean water fraction through drain 8, then an additional sludge/water separation must indeed take place subsequently.

According to a further preferred embodiment, the clean water is removed after the sapropel concentrate feedback into the anaerobic reactor has taken place. Clean water removal is also possible directly before the sapropel concentrate recycling. Then a comparatively high sapropel concentration will indeed be present in the FAR at the beginning of the next cycle.

According to a further preferred embodiment, the sludge level in the FAR is ascertained shortly before water removal, and the water fraction to be extracted is adjusted accordingly.

DETAILED DESCRIPTION OF THE PREFERRED EMBODIMENTS

Figure 1:
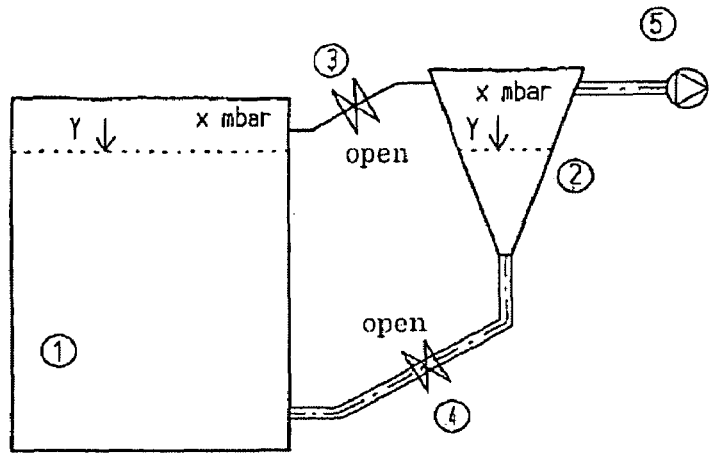
FIG. 1 depicts a facility of the invention in a pusher open condition.

The facility includes an anaerobic reactor 1 and a sapropel enrichment reactor (FAR)2, which are connected with one another through a gas pusher 3 and a sapropel pusher 4. Both reactors 1, 2 are closed off in gas-tight manner. The FAR 2 is provided with a gas pump 5 which is suited for bringing about an underpressure in the FAR.

In FIG. 1, the gas pusher 3 and the sapropel pusher 4 are open, the water level status in both containers (resting water level status y) balance each other out. The same pressure of x mbar is present in the gas phases of both reactors 1, 2.

Figure 2:
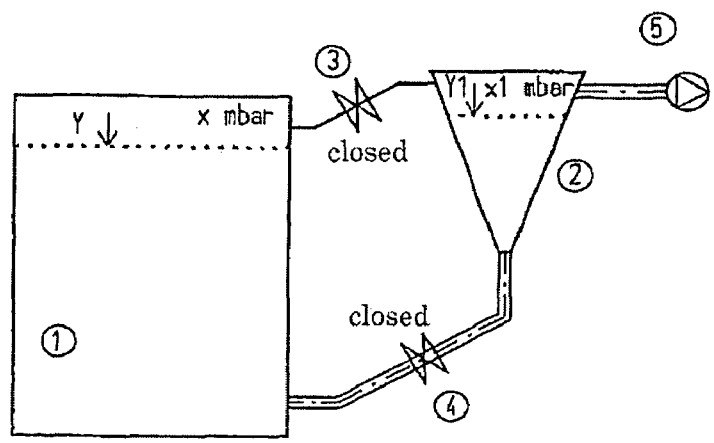
FIG. 2 depicts the facility of the invention in a pusher closed condition.

The cyclically repetitive process begins in that the gas pusher 3 is closed and the gas vacuum pump 5 in the gas space of FAR 2 generates a defined underpressure x1 mbar. A new higher water level y1 in FAR 2 corresponds with this underpressure by administering a corresponding amount of sapropel from the reactor 1. After x1 mbar has been reached, the pusher 4 is closed (FIG. 2) and the underpressure is, if need be, intensified to x2 mbar. After this, the underpressure is maintained. The duration of the underpressure can last some minutes to several hours according to the degree of digestion. The purpose of this underpressure treatment is to reduce the gas partial pressures (here it is almost exclusively a matter of carbon dioxide $CO_2$ and methane $CH_4$) of the sapropel in the FAR 2 to be brought down to below x mbar.

Figure 3:
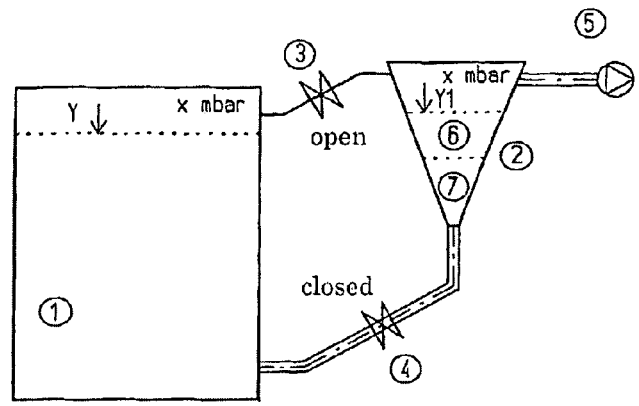
FIG. 3 shows the facility in a intermediate processing stage.

After this, the gas pusher 3 is opened so that once again, a gas pressure of approximately x mbar arises in the gas phase of the FAR 2. Since the gas partial pressures in the liquid phase of the FAR 2 lie significantly below x mbar, the sapropel in FAR 2 will sediment and a supernatant, almost sapropel-free purely watery zone 6 will form until the abovesaid partial pressures rise to x mbar again on the basis of the continuing digestion processes without the disturbing influence of rising gas bubbles (FIG. 3).

Figure 4:
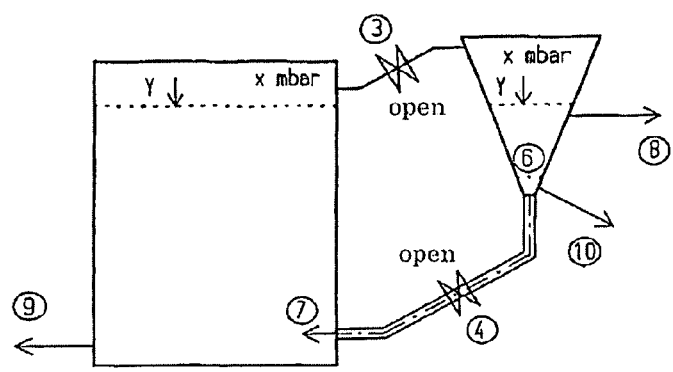
FIG. 4 shows the facility in a later processing stage.

After this, the sludge pusher 4 is opened. The sapropel concentrate 7 in the lower region of the FAR flows into the reactor 1 until both water level statuses are adjusted to y again. The almost sapropel-free water fraction is then removed from an outlet and the entire system can then be fed with this amount in raw substrate (FIG. 4). Thereafter, a new enrichment cycle can begin.

The discontinuous enrichment cycles run as long as or as often as it is needed to reach maximally possible or desired level of TS content in reactor 1.

After this, the net excess sludge production in sapropel can be removed with the extracted water fractions. Before this circumstance arises, the sapropel concentrate can be removed through a further removal site 9.

Certain advantages of this process management can be designated as follows:

I) A very extensive decoupling of the particulate component of the sapropel from the length of stay of the hydraulic component of the wastewater/sludge administered takes place. Through this process management, the length of stay of the sapropel can be adjusted to the desired sludge age of, e.g., 20 days, although the length of stay of the hydraulic component only amounts to 5 days, for example.

II) The structure and operation of the sapropel enrichment reactor (FAR) is conceivably simple. No aggregates/devices of any type or movable parts are situated in this FAR which would make maintenance difficult. The automatic operation rests exclusively upon the external automatic pushers 3 and 4 and the gas pump 5.

III) The FAR can also (FIG. 4) be integrated into stage or parallel operation: Reactors operated parallelly as well as a second stage can be connected with a FAR, and the sapropel enrichment can be guided in any desired direction.

Although described with reference to preferred embodiments of the invention, it should be readily understood that various changes and/or modifications can be made to the invention without departing from the spirit thereof. In general, the invention is only intended to be limited by the scope of the following claims.

I claim:

1. A method for anaerobic treatment of wastewater and sludge in a plant comprising a digestive reactor coupled with a sapropel enrichment reactor, wherein a portion of digesting sludge is discontinuously evacuated and fed back into the digestive reactor, comprising the steps of:
   closing a gas pusher in a gas line connecting both the digestive and sapropel enrichment reactors, while a sludge pusher in a sludge line connecting both the digestive and sapropel enrichment reactors is open;
   operating a gas pump generating an underpressure in a gas space of the sapropel enrichment reactor while feeding digesting sludge from the digestive reactor into the sapropel enrichment reactor;
   closing the sludge pusher;
   maintaining the underpressure in the gas space of the sapropel enrichment reactor;
   opening the gas pusher;
   opening the sludge pusher to effect a reflux of sapropel concentrate from the sapropel enrichment reactor into the digesting reactor;
   removing a sapropel-free water fraction from the sapropel enrichment reactor; and
   repeating the aforementioned steps.

2. The method according to claim 1, further comprising: increasing the underpressure after closing the sludge pusher.

3. A method for anaerobic treatment of wastewater and sludge in a water treatment plant comprising a digestive reactor coupled with a sapropel enrichment reactor via a gas line and a sludge line, the method comprising the steps of:
   closing a gas pusher in the gas line while a sludge pusher in the sludge line is open;
   generating an underpressure in a gas space of the sapropel enrichment reactor utilizing a gas pump while feeding sludge from the digestive reactor into the sapropel enrichment reactor through the sludge line;
   closing the sludge pusher;
   maintaining the underpressure in the gas space of the sapropel enrichment reactor for a period of time;
   opening the gas pusher, thereby relieving gas pressure and forming a substantially sapropel-free water fraction and a sapropel concentrate in the sapropel enrichment reactor;
   opening the sludge pusher to effect a reflux of sapropel concentrate from the sapropel enrichment reactor into the digestive reactor;
   removing a sapropel-free water fraction from the sapropel enrichment reactor; and
   repeating the aforementioned steps to provide a plurality of discontinuous enrichment cycles.

4. The method of claim 3, further comprising:
   opening the gas pusher and the sapropel pusher such that a level of waste water and sludge in the digestive reactor is equal to a level of waste water and sludge in the sapropel enrichment reactor.

5. The method of claim 3, further comprising:
   increasing the underpressure in the gas space of the sapropel enrichment reactor after closing the sludge pusher.

6. The method of claim 3, further comprising:
   feeding a raw substrate of wastewater and sludge into the water treatment plant.

* * * * *